US009696931B2

(12) United States Patent
Kuttner et al.

(10) Patent No.: US 9,696,931 B2
(45) Date of Patent: Jul. 4, 2017

(54) REGION-BASED STORAGE FOR VOLUME DATA AND METADATA

(71) Applicant: INTERNATIONAL BUSINESS MACHINES CORPORATION, Armonk, NY (US)

(72) Inventors: Yifat Kuttner, Kochav Yair (IL); Sergey Marenkov, Tel Aviv (IL); Ury Matarazzo, Petah Tikva (IL); Yosef Shatsky, Karnei Shomron (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 14 days.

(21) Appl. No.: 14/738,553

(22) Filed: Jun. 12, 2015

(65) Prior Publication Data
US 2016/0364146 A1  Dec. 15, 2016

(51) Int. Cl.
*G06F 3/06* (2006.01)
*G06F 12/00* (2006.01)

(52) U.S. Cl.
CPC .......... *G06F 3/0631* (2013.01); *G06F 3/067* (2013.01); *G06F 3/0608* (2013.01); *G06F 3/0644* (2013.01)

(58) Field of Classification Search
CPC ..... G06F 3/0604; G06F 3/0631; G06F 3/0673
See application file for complete search history.

(56) References Cited

U.S. PATENT DOCUMENTS

| 2011/0099461 | A1* | 4/2011 | Rajpal ............... G06F 11/073 714/807 |
| 2011/0138144 | A1 | 6/2011 | Tamura et al. |
| 2014/0025917 | A1 | 1/2014 | Kaczmarczyk et al. |
| 2014/0068184 | A1 | 3/2014 | Edwards et al. |
| 2014/0195749 | A1 | 7/2014 | Colgrove et al. |
| 2014/0325157 | A1 | 10/2014 | Sangapu et al. |

FOREIGN PATENT DOCUMENTS

| EP | 2216710 A2 | 9/2009 |
| WO | 2010040078 A2 | 4/2010 |
| WO | 2012082664 A2 | 6/2012 |

OTHER PUBLICATIONS

Meyer et al., "A study of practical deduplication" ACM Transactions on Storage (TOS) 7, No. 4 (2012): 14.

* cited by examiner

*Primary Examiner* — Yong Choe
(74) *Attorney, Agent, or Firm* — Griffiths & Seaton PLLC

(57) ABSTRACT

Methods, computing systems and computer program products implement embodiments of the present invention that include receiving a request to create a storage entity on a storage system, the storage entity including data and metadata, the metadata used to manage the storage entity. Upon receiving the request, multiple metadata attributes are identified for the metadata, and for each given identified metadata attribute, a respective metadata region is created on the storage system, and a subset of the metadata having the given metadata attribute is stored to the respective metadata region. Finally, a data region is created on the storage system, and the data is stored to the data region.

17 Claims, 4 Drawing Sheets

REGION-BASED STORAGE FOR VOLUME DATA AND METADATA

FIELD OF THE INVENTION

The present invention relates generally to storage systems, and specifically to segmenting a storage entity such as a logical volume into multiple metadata and data regions.

BACKGROUND

In computer storage systems (also referred to herein as storage subsystems), disk partitioning and logical volume management are used to manage physical storage devices such as hard disk drives. In disk partitioning, a single storage device is divided into multiple logical storage units referred to as partitions, thereby treating one physical storage device as if it were multiple disks. Logical volume management provides a method of allocating space on mass-storage devices that is more flexible than conventional partitioning schemes. In particular, a volume manager can concatenate, stripe together or otherwise combine blocks (a block, also referred to as a partition, is a sequence of bytes having a specific length, typically one megabyte) into larger virtual blocks that administrators can re-size or move, potentially without interrupting system use.

To manage a given volume, a partition table can be utilized to define the relationship between a logical address of a logical volume and physical blocks on the physical storage device. Upon receiving a request to perform an input/output (I/O) operation at a specific logical address on the given volume, a storage system can utilize the partition table identify the physical location on a storage device that corresponds to the specific logical address.

The description above is presented as a general overview of related art in this field and should not be construed as an admission that any of the information it contains constitutes prior art against the present patent application.

SUMMARY

There is provided, in accordance with an embodiment of the present invention a method, including receiving, by a processor, a request to create a storage entity on a storage system, the storage entity including data and metadata, the metadata used to manage the storage entity, identifying multiple metadata attributes for the metadata, for each given identified metadata attribute, creating, on the storage system, a respective metadata region, and storing, to the respective metadata region, a subset of the metadata having the given metadata attribute, creating a data region on the storage system, and storing the data to the data region.

There is also provided, in accordance with an embodiment of the present invention an apparatus, including one or more storage devices, and a processor configured, to receive a request to create a storage entity, the storage entity including data and metadata, the metadata used to manage the storage entity, to identify multiple metadata attributes for the metadata, for each given identified metadata attribute, to create, on a given storage device, a respective metadata region, and to store, to the respective metadata region, a subset of the metadata having the given metadata attribute, to create a data region on the storage system, and to store the data to the data region.

There is further provided, in accordance with an embodiment of the present invention a computer program product, the computer program product including a non-transitory computer readable storage medium having computer readable program code embodied therewith, the computer readable program code executing on a storage system and including computer readable program code configured to receive a request to create a storage entity on the storage system, the storage entity including data and metadata, the metadata used to manage the storage entity, computer readable program code configured to identify multiple metadata attributes for the metadata, for each given identified metadata attribute, computer readable program code configured to create, on the storage system, a respective metadata region, and computer readable program code configured to store, to the respective metadata region, a subset of the metadata having the given metadata attribute, computer readable program code configured to create a data region on the storage system, and computer readable program code configured to store the data to the data region.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Figure 1:
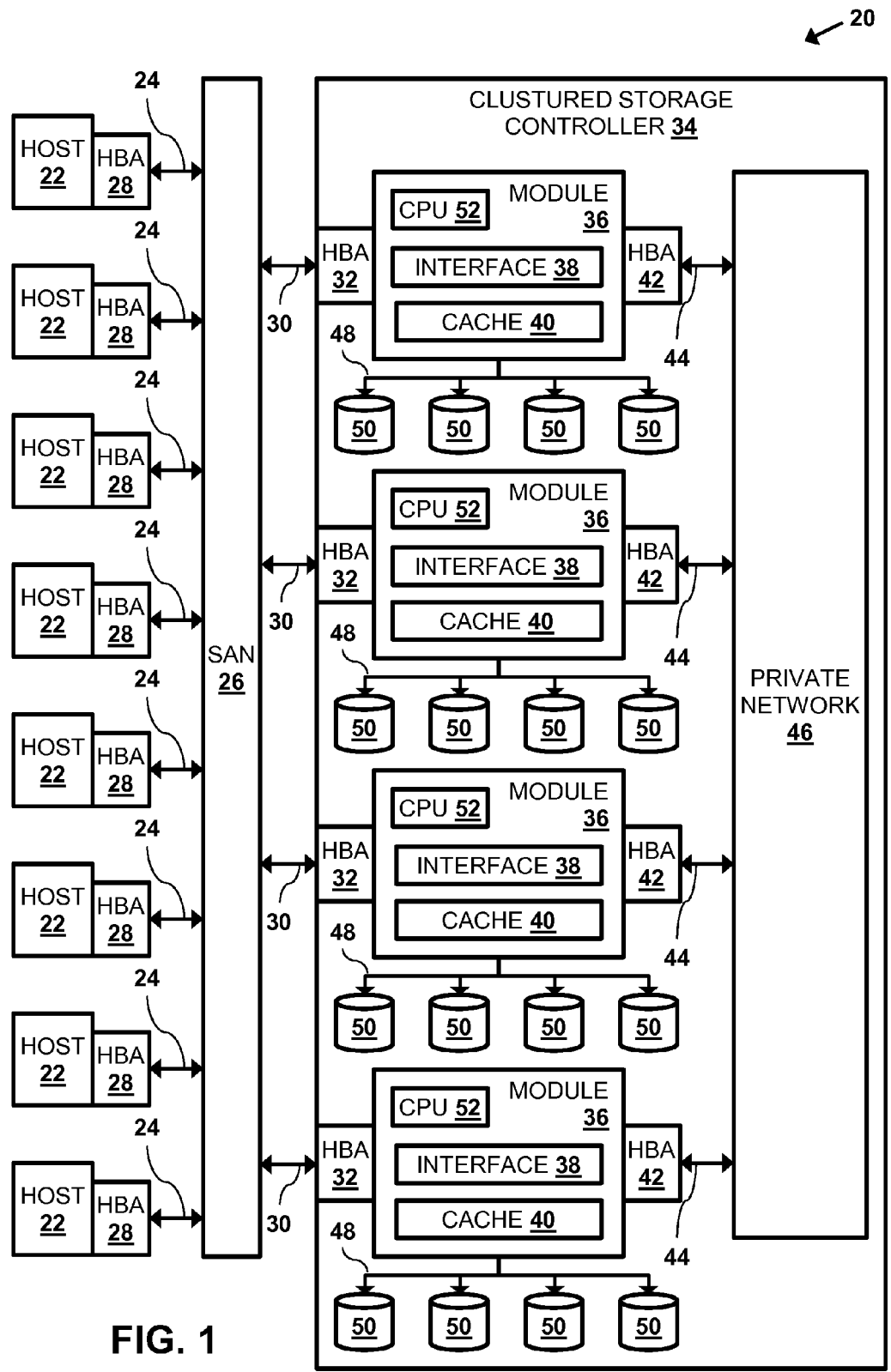
FIG. 1 is a block diagram that schematically illustrates a storage system comprising a storage controller, in accordance with an embodiment of the present invention.

Storage systems that provide features such as compression and deduplication typically manage large quantities of metadata. To manage the metadata, the storage system can either store all the metadata in memory or store the metadata on a storage device and use caching to bring only the required metadata into memory. If the metadata is stored in memory, a large amount of memory may be required. Additionally, in multi-node storage systems, the required metadata is typically replicated among the nodes in order to provide resiliency.

When storing the metadata on a storage device such as a hard disk, thin provisioning can be used to "slice" the disk into blocks, and allocate these blocks to volumes on an as-needed basis. By using thin provisioning to manage logical volumes, the metadata can grow as the data grows. However, since thin provisioning does not differentiate between data and metadata (i.e., it simply manages storage space allocated to a given volume) managing the data and metadata blocks can be become somewhat complex. Additionally, intermixing data and metadata within blocks of a given volume may not provide spatial locality of the metadata, which can impact performance.

The performance challenges can be more severe in a journaled system that stores metadata in chains of blocks. Each chain is composed of non-continuous blocks, which can lead to high seek-time for a spinning disk platform, and can increase input/output (I/O) operations if the block size is smaller than that maximal I/O operation size, especially when access to the metadata is a significant factor in performance or start-up time.

Embodiments of the present invention provide methods and systems for efficiently storing storage entity metadata and data in a storage system. Examples of storage entities include, but are not limited to, chunks, blocks, files, volumes and objects. In embodiments described herein, the data and metadata for a given storage entity is segmented into "regions" in order to improve performance and simplify management of different types of data and metadata. As described hereinbelow, thin provisioning can be used when segmenting the data and metadata into their respective regions.

In operation, a processor receives a request to create a storage entity on a storage system, the storage entity comprising data and metadata, wherein the processor is configured to use the metadata for managing the storage entity. Upon receiving the request, multiple metadata attributes for the metadata are identified, and for each given identified metadata attribute, a respective metadata region is created on the storage system, and a subset of the metadata having the given metadata attribute is stored to the respective metadata region. Finally, a data region is created on the storage system, and data can then be stored to the data region. In embodiments where multiple data types are identified for the data, creating the data region may comprise creating a separate data sub-region for each of the identified data types.

In storage systems embodiments of the present invention, the regions can be implemented as follows:

A given storage entity's metadata and data can be separated by storing the data to one or more "data" regions and the metadata to one or more "metadata" regions.

When metadata in layered, a separate metadata region can be used for each layer.

A separate region can be used to store deduplication hashes.

A "temporary" region can be used for temporary data generated by a recovery process, and then deleted upon completing the recovery process.

Regions can also be used when upgrading a storage entity's data and/or metadata from an old format to a new format. For example, a new software release was recently installed on a storage system, and the new release uses a new data format for the information in a given region. Since embodiments of the present invention can segment data into regions based on characteristics of the data, only the content of the given region is affected. Additionally, when migrating the content (i.e., data) of the old region to the new format, a new region can be created and the content can then be migrated either immediately or on-demand.

By using multiple metadata and data regions to store storage entities, systems implementing embodiments of the present invention can help manage storage entities by:

Expand the concept data and metadata separation by separating different types of metadata and data.

Storing each different type of metadata and data to a separate region, thereby simplifying data and metadata management, and possibly increasing performance.

The regions of a given storage entity can be stored on different storage devices or on a single storage device via thin provisioning. Additionally, regions of a given storage entity can be distributed among different types of storage device (e.g., hard disk drives and solid state disk drives).

The number of regions can be scalable to service the number of data characteristic groups that are identified (for example compression metadata and deduplication metadata).

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes a processor 52, an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Processors 52 may comprise general-purpose central processing units (CPU) or special-purpose embedded processors, which are programmed in software or firmware to carry out the functions described herein. The software may be downloaded to modules 36 in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

Figure 2:
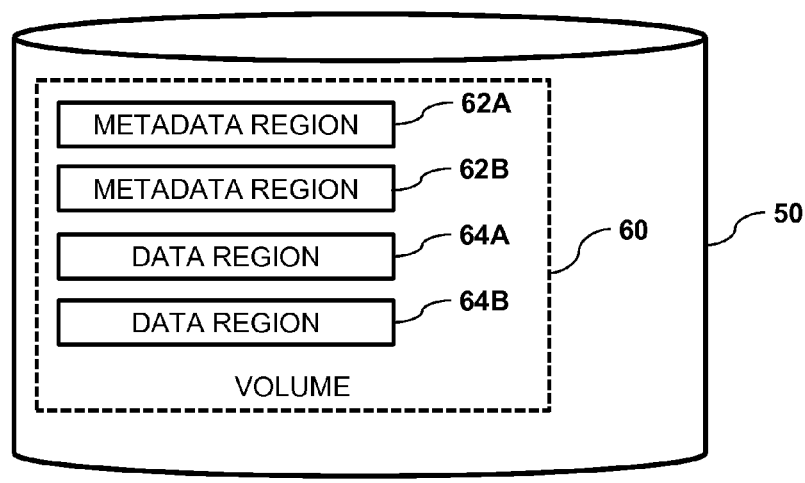
FIG. 2 is a block diagram that schematically illustrates a logical volume comprising metadata regions and data regions stored on a single storage device in the storage controller, in accordance with a first embodiment of the present invention.

FIG. 2 is a block diagram that schematically illustrates a logical volume 60 comprising two metadata regions 62 and two data regions 64 (also referred to herein as sub-regions 64) stored on a single storage device 50, in accordance with a first embodiment of the present invention. In the configuration shown in FIG. 2, metadata regions 62 and data regions 64 can be differentiated by appending a letter to the identifying numeral, so that the metadata regions comprise metadata regions 62A and 62B and the data regions comprise data regions 64A and 64B. Additionally, while the example in FIG. 2 (and in the descriptions hereinbelow referencing FIGS. 3-5) describes volume 60 comprising regions 62 and 64, segmenting any other type of storage entity into multiple metadata and data regions is considered to be within the spirit and scope of the present invention.

Figure 3:
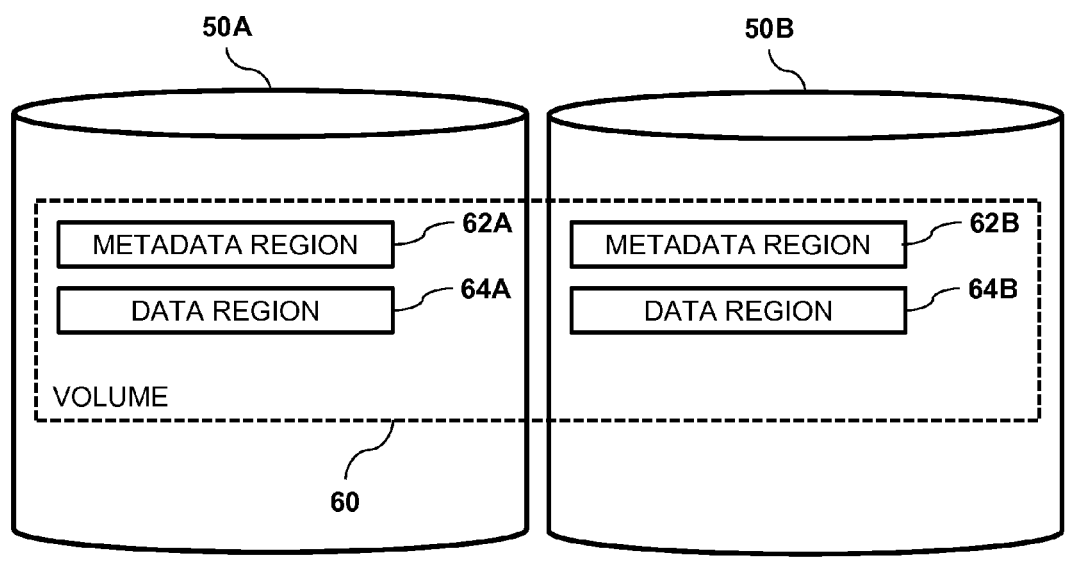
FIG. 3 is a block diagram that schematically illustrates the logical volume comprising metadata regions and data regions distributed among multiple storage devices in the storage controller, in accordance with a second embodiment of the present invention.

FIG. 3 is a block diagram that schematically illustrates a logical volume 60 comprising two metadata regions 62 and two data regions 64 distributed among two storage devices 50, in accordance with a first embodiment of the present invention. In the configuration shown in FIG. 3, storage devices 50 can be differentiated by appending a letter to the identifying numeral, so that the storage devices comprise storage device 50A storing metadata region 62A and data region 64A, and storage device 50B storing metadata region 62B and data region 64B.

In some embodiments storage devices 50A and 50B may have different performance characteristics that can be exploited by embodiments of the present invention. For example, if storage device 50A comprises a solid state disk drive and storage device 50B comprise a hard disk drive, then metadata 62A may comprise a deduplication hash table and the volume's data may comprise a database index, which can both benefit from being stored on a higher performance storage device. Any other metadata and data comprising information that is less performance sensitive can therefore be stored on a lower performance storage device such as storage device 50B.

In some embodiments, processor 52 may execute a thin provisioning layer (not shown) that the processor can use optimize utilization of available storage. Instead of allocating all requested physical blocks of data to data volumes up front, thin provisioning implements on-demand allocation of the storage units to the data volumes. This methodology helps eliminate almost all "whitespace" (i.e., storage units allocated to data volumes but not storing any data), thereby improving storage utilization rates over storage allocation methods such as thick provisioning that allocate, to individual data volumes, storage units that may remain unused (i.e., not storing any data).

In embodiments of the present invention, metadata 62 may comprise compression and/or deduplication information, and a new layer of software (not shown) that provides support for regions can be introduced above cache 40 and above the thin provisioning layer. In operation, each of the regions has its own address space and, to a certain extent, behaves as a separate volume. Regions 62 and 64 can be created, read from, written to, truncated, and deleted. Additionally, since the data and the metadata regions are coupled with their encompassing volume (e.g., volume 60), processor 52 can perform accounting at the volume level. Therefore, a deletion of volume 60 will delete all of its regions 62 and 64.

The thin provisioning layer enables processor 52 to dynamically create, expand and contract the data and the metadata regions, and cache 40 enables data to be prefetched. Therefore, the data and the metadata in volume 60 can be stored in different regions 62 and 64, thereby allowing each of the regions to be spatially localized.

Figure 4:
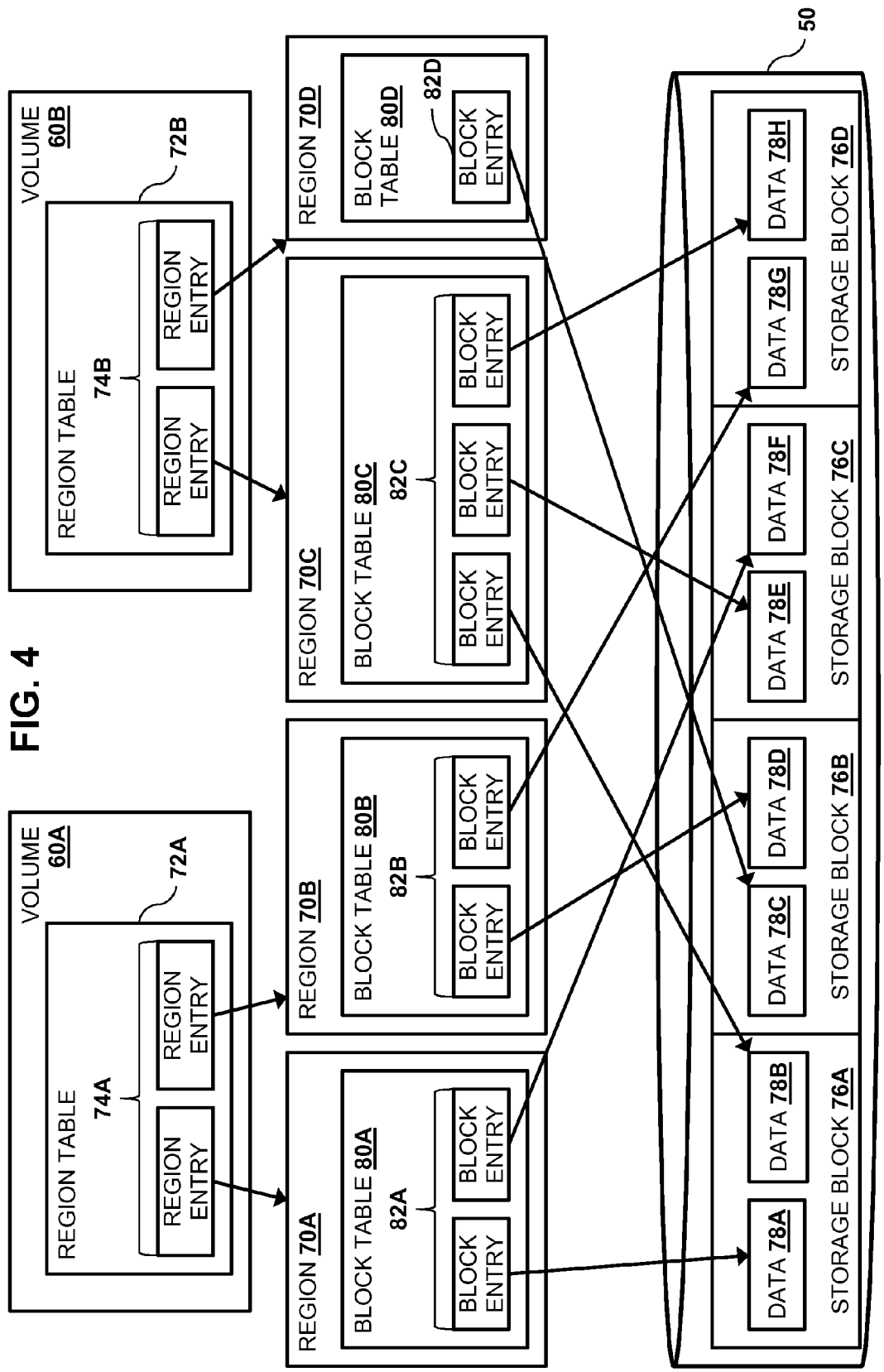
FIG. 4 is a block diagram that schematically illustrates a distribution of the metadata and data regions on a given storage device, in accordance with an embodiment of the present invention.

FIG. 4 is a block diagram that schematically illustrates volumes 60 comprising regions 70 distributed on a given storage device 50, in accordance with an embodiment of the present invention. In the example shown in FIG. 4, regions 70 comprise generic regions that comprises either a given metadata region 62 or a given data region 64. Additionally, in the example shown in FIG. 4, volumes 60 and their respective components can be differentiated by appending a letter to the identifying numeral, so that the volumes comprise volume 60A and 60B.

Each volume 60 comprises a region table 72 that has multiple region entries 74, each of the region entries referencing a unique region 70. In the example shown in FIG. 4, regions 70 and their respective components can be differentiated by appending a letter to the identifying numeral, so that the regions comprise regions 70A-70D. As shown in the figure, a first given region entry 74A references region 70A, a second given region entry 74A references region 70B, a first given region entry 74B references region 70C, and a second given region entry 74B references region 70D.

Storage device 50 comprises multiple storage blocks 76 that store data 78, and each region 70 comprises a block table 80 that has multiple region entries 82, each of the block entries referencing a unique data 78. In the example shown in FIG. 4, storage blocks 76 and data 78 can be differentiated by appending a letter to the identifying numeral, so that the storage blocks comprise storage blocks 76A-76D and the data comprises data 78A-78H.

As shown in the figure, a first given block entry 82A references data 78A in storage block 76A, a second given block entry 82A references data 78F in storage block 76C, a first given block entry 82B references data 78D in storage block 76B, a second given block entry 82B references data 78G in storage block 76D, a first given block entry 82C references data 78B in storage block 76A, a second given block entry 82C references data 78E in storage block 76C, a third given block entry 82C references data 78H in storage block 76D, and block entry 82D references data 78C in storage block 76B.

When using regions 70 for volumes 60 in storage controller 34, processor 52 first identifies unique characteristics of data 78 that comprises the volume's metadata and data. For example if there is given data 78 that is often read together or read sequentially, then the given data might be a good candidate for a given region 70. Additionally or alternatively given data 78 that is allocated or discarded together may also a very good candidate for a given region 70. In some embodiments, a given region 70 can be suitable to store data of a particular type such as the data required for crash recovery or upgrade, deduplication hashes, etc.

If desired, a given region 70 can also be divided in to blocks 76. For each region it can be determined if it is divided and how it is divided. Dividing regions 70 allows for better optimization based on the characteristics of the data stored in each particular region. Additionally, storage controller 34 may store metadata pertaining to the division of the regions. For example, if a given region 70 stores deduplication hashes, metadata such as the deduplication hashes can be stored in a predefined region 70 that does not require metadata (i.e. beginning of region 0).

As described supra, regions 70 can be thinly provisioned. Each volume 60 comprises the combined data 78 in all its respective regions 70. The order of writes to each given region 70 can determine the arrangement of "chunks" in the storage controller.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Region-Level Volume Management

Figure 5:
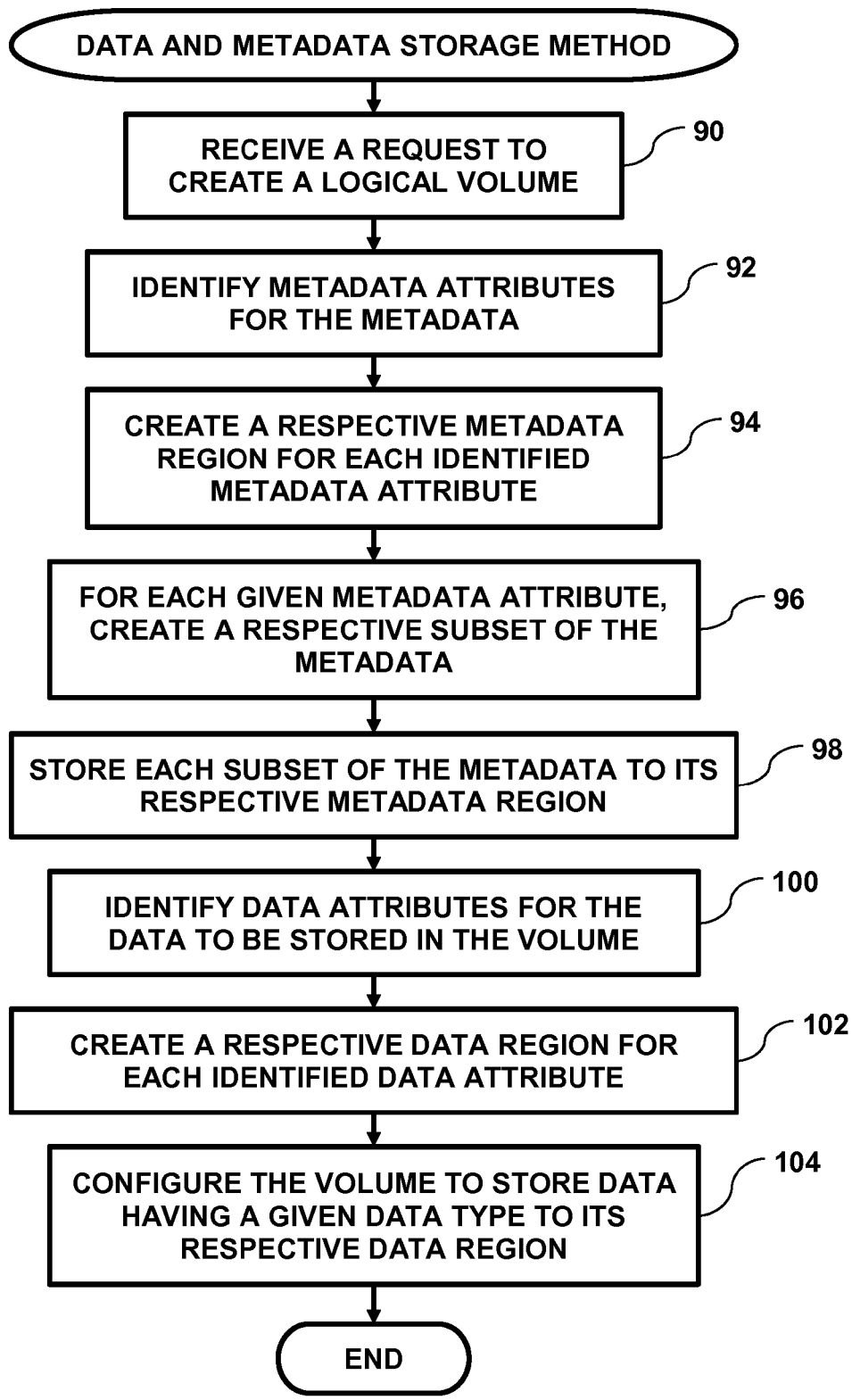
FIG. 5 is a flow diagram that schematically illustrates a method of creating a volume comprising metadata and data regions, in accordance with an embodiment of the present invention.

FIG. 5 is a flow diagram that schematically illustrates a method of defining a given volume 60 comprising regions 62 and 64 (regions 62 and 64 may also be collectively referred to as regions 70), in accordance with an embodiment of the present invention, in accordance an embodiment of the present invention. In a receive step 90, processor 52 receives a request to create a given volume 60. Volume 60 comprises data and metadata that processor 52 uses to manage access to the data in the volume.

In a first identification step 92, processor 52 identifies metadata attributes for the metadata. Examples of types of the attributes for the metadata include, but are not limited to:
  Metadata that can be distinguished by a compression ratio (e.g., deduplication hashes).
  Temporary metadata.
  Metadata requiring fast access. In embodiments of the present invention, metadata required to be access quickly can be stored on a solid state disk drive.
  A version of a data format for data managed by the metadata. For example, if data referenced by the metadata was migrated, or software accessing the data was upgraded, the metadata can indicate the migration/update.

In a first creation step 94, processor 52 creates a respective metadata region 62 for each identified metadata attribute. In some embodiments, processor 52 may specify a compression condition based on a metadata attribute, and compress a given metadata region if the compression condition is met. For example, a compression condition can be specified to compress data if the attribute of given metadata indicates that the given metadata does not comprise deduplication hashes. Similarly, a compression condition can be specified to compress data or to specify a type of storage device 50 for the metadata. For example, metadata that needs to be accessed quickly can be stored on a solid state drive, and metadata that does not need to be accessed quickly can be stored on a hard disk drive.

In a second creation step 96, the processor creates, for each identified metadata attribute, a respective subset of the metadata, and in a first store step 98, the processor stores each subset of the metadata to its respective metadata region 62. In other words, the metadata stored in each subset has a common metadata attribute, and each metadata region 62 stores one of the subsets.

In a second identification step 100, processor 52 identifies data attributes for data to be stored in the storage entity, and in a third creation step 102, the processor creates a respective data region 64 for each identified data attribute. For example, the volume may be created for a database having database records and a database index. Processor 52 can create a first data region 64 on a solid state disk drive to store the index and a second data region 64 on a hard disk drive to store the records. Finally, in a fourth creation step 104, processor 52 configures volume 60 to store, to the respective data region 64, a data subset of the data having the given data attribute, and the method ends.

In some embodiments, processor 52 can assign, to each storage device 50, a storage attribute. For example processor 52 can assign a "fast" storage attribute to a solid state disk drive and a "slow" storage attribute to a hard disk drive. In operation, processor can associate each metadata type and data type with a given storage attribute. For example, deduplication hash metadata can be associated with a "fast" storage attribute. Therefore, when creating the metadata and the data regions (in steps 94 and 102), processor 52 can create and initialize the regions on the appropriate storage device(s).

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
receiving, by a processor, a request to create a storage entity on a storage system, the storage entity comprising data and metadata, the metadata used to manage the storage entity;
identifying multiple metadata attributes for the metadata;
for each given identified metadata attribute:
creating, on the storage system, a respective metadata region; and
storing, to the respective metadata region, a subset of the metadata having the given metadata attribute;
creating a data region on the storage system; and
storing the data to the data region;
wherein creating the data region comprises identifying a plurality of data attributes for the data, and for each given identified data attribute, creating, a respective data sub-region on the storage system, and storing given data having a given data type to its respective sub-region.

2. The method according to claim 1, wherein the storage system comprises multiple storage devices, each of the storage devices having a respective storage attribute, and comprising associating each given metadata attribute with a first given storage attribute, and associating each given data attribute with a second given storage attribute.

3. The method according to claim 2, wherein creating, on the storage system, a given metadata region for a given metadata attribute comprises selecting a given storage device whose respective storage attribute is associated with the given metadata attribute, and initializing the given metadata region on the selected storage device.

4. The method according to claim 2, wherein creating a given data sub-region on the storage system for a given data attribute comprises selecting a given storage device whose respective storage attribute is associated with the given data attribute, and initializing the given data region on the selected storage device.

5. The method according to claim 1, and comprising defining additional metadata for an operation, creating an additional metadata region on the storage system, storing the additional data to the additional metadata region, and deleting the additional metadata region upon completing the operation.

6. The method according to claim 1, and comprising specifying a compression condition comprising a given metadata attribute, and compressing a given metadata region upon its respective metadata attribute meeting the compression condition.

7. An apparatus, comprising:
one or more storage devices; and
a processor configured:
to receive a request to create a storage entity, the storage entity comprising data and metadata, the metadata used to manage the storage entity;
to identify multiple metadata attributes for the metadata,
for each given identified metadata attribute:
to create, on a given storage device, a respective metadata region, and
to store, to the respective metadata region, a subset of the metadata having the given metadata attribute,
to create a data region on the storage system, and
to store the data to the data region;
wherein creating the data region comprises identifying a plurality of data attributes for the data, and for each given identified data attribute, creating, a respective data sub-region on the storage system, and storing given data having a given data type to its respective sub-region.

8. The apparatus according to claim 7, wherein each of the one or more storage devices has a respective storage attribute, and wherein the processor is configured to associate each given metadata attribute with a first given storage attribute, and to associate each given data attribute with a second given storage attribute.

9. The apparatus according to claim 8, wherein the processor is configured to create a given metadata region for a given metadata attribute by selecting a given storage device whose respective storage attribute is associated with the given metadata attribute, and to initialize the given metadata region on the selected storage device.

10. The apparatus according to claim 8, wherein the processor is configured to create a given data sub-region on the storage system for a given data attribute by selecting a given storage device whose respective storage attribute is associated with the given data attribute, and initializing the given data region on the selected storage device.

11. The apparatus according to claim 7, wherein the processor is configured to define additional metadata for an operation, to create an additional metadata region on the storage system, storing the additional data to the additional metadata region, and to delete the additional metadata region upon completing the operation.

12. The apparatus according to claim 7, wherein the processor is configured to specify a compression condition comprising a given metadata attribute, and to compress a given metadata region upon its respective metadata attribute meeting the compression condition.

13. A computer program product, the computer program product comprising:
a non-transitory computer readable storage medium having computer readable program code embodied therewith, the computer readable program code executing on a storage system and comprising:
computer readable program code configured to receive a request to create a storage entity on the storage system, the storage entity comprising data and metadata, the metadata used to manage the storage entity;
computer readable program code configured to identify multiple metadata attributes for the metadata;
for each given identified metadata attribute:
computer readable program code configured to create, on the storage system, a respective metadata region; and computer readable program code configured to store, to the respective metadata region, a subset of the metadata having the given metadata attribute;

computer readable program code configured to create a data region on the storage system; and computer readable program code configured to store the data to the data region;

wherein creating the data region comprises identifying a plurality of data attributes for the data, and for each given identified data attribute, creating, a respective data sub-region on the storage system, and storing given data having a given data type to its respective sub-region.

14. The computer program product according to claim 13, wherein the storage system comprises multiple storage devices, each of the storage devices having a respective storage attribute, and comprising computer readable program code configured to associate each given metadata attribute with a first given storage attribute, and to associate each given data attribute with a second given storage attribute.

15. The computer program product according to claim 14, wherein the computer readable program code is configured to create, on the storage system, a given metadata region for a given metadata attribute by selecting a given storage device whose respective storage attribute is associated with the given metadata attribute, and initializing the given metadata region on the selected storage device, and wherein the computer readable program code is configured to create a given data sub-region on the storage system for a given data attribute by selecting a given storage device whose respective storage attribute is associated with the given data attribute, and initializing the given data region on the selected storage device.

16. The computer program product according to claim 13, and comprising computer readable program code configured to define additional metadata for an operation, to create an additional metadata region on the storage system, storing the additional data to the additional metadata region, and to delete the additional metadata region upon completing the operation.

17. The computer program product according to claim 13, and comprising computer readable program code configured to specify a compression condition comprising a given metadata attribute, and to compress a given metadata region upon its respective metadata attribute meeting the compression condition.

* * * * *